Sept. 20, 1955     H. GIM     2,718,175
MOTOR ADJUSTED REAR VIEW MIRRORS
Filed Aug. 19, 1952
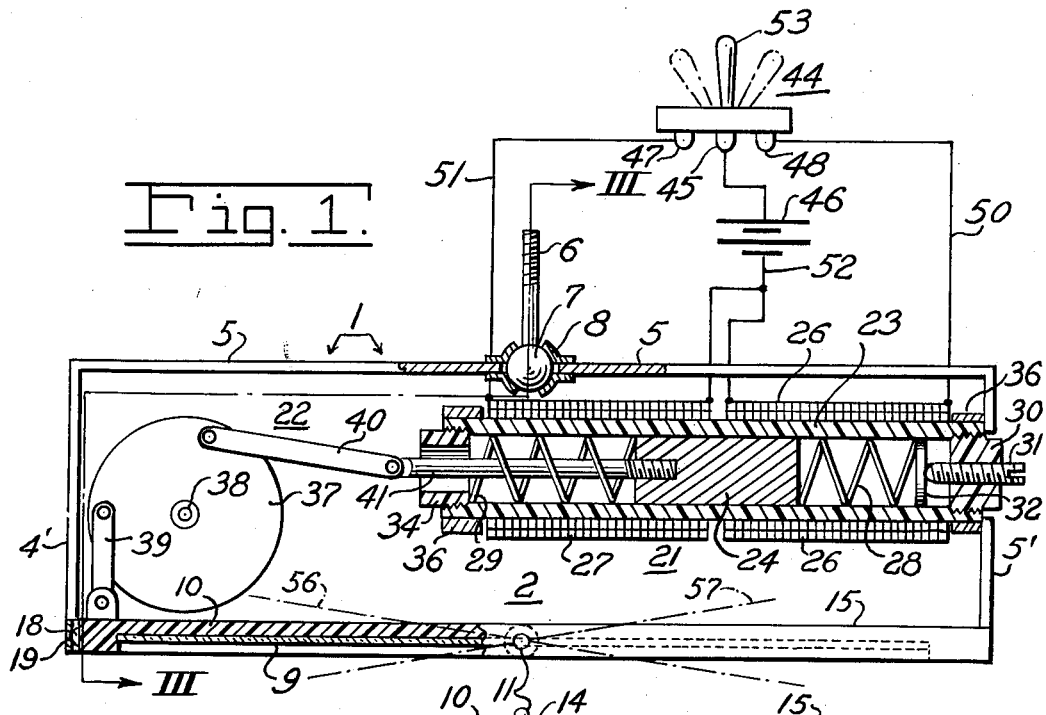
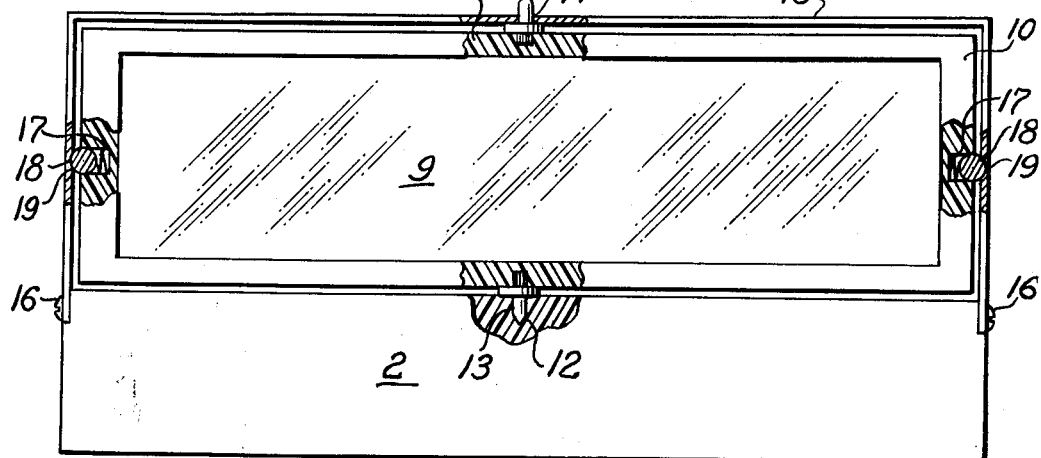
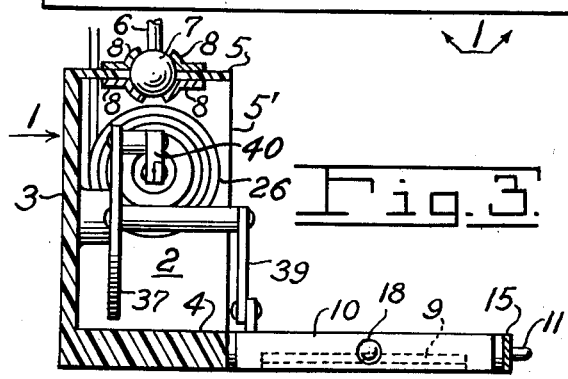
INVENTOR.
HARRY GIM
BY
Zugelter & Zugelter
Attys.

United States Patent Office 2,718,175
Patented Sept. 20, 1955

2,718,175

MOTOR ADJUSTED REAR VIEW MIRRORS

Harry Gim, Cincinnati, Ohio

Application August 19, 1952, Serial No. 305,129

2 Claims. (Cl. 88—98)

This invention relates to rear view mirrors.

An object of this invention is to provide a rear view mirror assembly which may be mounted on a motor vehicle, for example, and the assembly adjusted for position, and in which assembly the mirror is mounted on pivots or trunnions whereby it may be turned relative to the frame to adjust the angle thereof.

A further object of the invention is to provide a rear view mirror assembly of the type referred to above, in which there is provided a motor mechanism and a drive mechanism which connects the motor mechanism to the mirror, so that by means of a control element the angle of the mirror may be adjusted at will from either a nearby or a remote point.

Other objects of the invention will be apparent to those skilled in this art from the following description taken in conjunction with the accompanying drawings, in which:

Figure 1 is a top plan view partly in section, of a rear view mirror assembly arranged and constructed in accordance with an embodiment of the invention;

Fig. 2 is a view in front elevation, partly in section, of the device shown in Fig. 1; and Fig. 3 is an end view partly in section, taken on line III–III of Fig. 1.

In the drawings, a rear view mirror assembly 1 is illustrated that comprises a frame or body 2 of substantially U shape in section, having a base 3 and front and rear sides 4 and 5 and ends 4' and 5'. The rear side 5 is provided with a bolt 6 having a ball head 7 adapted to be received in a socket 8 mounted in side 5 whereby the mirror assembly may be adjustably secured to a motor vehicle, for example, at any desired location. By means of the ball head 7 and socket 8, the angular position of the entire assembly may be adjusted.

The rear view mirror assembly includes also a mirror 9, which is set, as shown in a substantially vertical position, in a frame or base 10. Frame 10 is provided with trunnions 11 and 12 disposed at about the mid point of the mirror, being located one above the other. Trunnion 12 is journalled in a bearing socket 13 formed in top edge of side 4 of the frame 2, and trunnion 11 is journalled in a bearing 14 formed in a band or frame 15 of substantially inverted U shape. The ends of frame 15 are secured to the opposite ends of side 4 by means of screws 16.

In order that the mirror 9 may be yieldingly held in a so-called neutral position, the ends of the frame 10 are provided with sockets 17 in which spring pressed balls 18 are received as shown. Balls 18 are disposed to register in the detents 19 in the ends of the frame 15 so as to yieldingly lock the mirror 9 in the neutral position.

In order that mirror 9 may be adjusted about a vertical axis containing said trunnions 11 and 12, to angular positions other than the neutral position shown in Figs. 1, 2 and 3, a motor means 21 and a driving mechanism 22 connecting the motor means and the mirror, are provided. The motor means 21 comprises a cylinder 23 having therein a member 24 that is slidable relative to member 23. The relative movement between member 23 and member 24 is imparted to the mirror through the driving mechanism 22. In the specific form illustrated, the motor means 21 is electric; therefore the cylinder 23 is made of non-magnetic material such as plastic, and member 24 is of magnetizable material. The energy for actuating member 24 is supplied by a pair of coil windings 26 and 27 mounted on the cylinder 23. The core member 24 is urged to a neutral position with respect to coils 26 and 27 by means of springs 28 and 29 disposed at the opposite ends of the core 24. Cylinder 23 is closed at one end by a screw plug 30 in which is threaded an adjustable screw 31 that bears on a thread plate 32 for spring 28. The opposite end of cylinder 23 is provided with a screw threaded ferrule 34 that bears on the outer end of spring 29. By means of screw 31, the initial tension in the springs 28 and 29 and therefore the initial position of core 24 may be adjusted. The cylindrical member 23 is secured to frame bottom 3 by means of clips 36.

The drive mechanism 22 may take various forms, but as illustrated it comprises a disk 37 mounted on the bearing pin 38 secured to the base of the frame, a link 39 secured to the disk near its periphery at one end and to the mirror frame 10 at its other end, as shown in Figs. 1 and 3. Disk 37 is connected to core member 24 by means of a connecting link 40 and a rod 41 which is secured to core member 24 in any suitable manner as by threading into same, as shown.

In order that coil windings 26 and 27 may be selectively energized, a three position switch 44 is provided. The switch includes a center contact 45 to which one side of a battery 46 is connected, and two contact members 47 and 48 which are connected respectively to one terminal of coil windings 26 and 27 by conductors 50 and 51. The opposite terminals of coil windings 26 and 27 are connected by a common conductor 52 to the other side, or terminal, of battery 46.

When switch lever 53 is in the position shown in the full line in Fig. 1, neither of coil windings 26 nor 27 is energized, so that core member 24 will be in the position shown in Fig. 1 and mirror 9 in its so-called neutral position. If switch lever 53 is moved to the right so as to connect coil 26 across battery 46, coil 26 is energized whereby the core 24 is moved to the right as seen in Fig. 1, causing the mirror to be actuated to an angular position indicated by dotted line 56. If switch lever 53 is moved to the left so as to make contact with contact 47, coil winding 27 is energized and the mirror is adjusted to the angular position indicated by dotted line 57. If switch lever 53 is held in one or the other of its circuit making positions, it will be apparent that the mirror will be held in one or the other of its positions that are indicated by dotted lines 56 and 57. If switch lever 53 is in its neutral position, the mirror will return to its so-called neutral position as indicated in Figs. 1 and 3.

By means of the motor adjusted mirror disclosed and described herein, it will be apparent that the mirror may be adjusted with ease and convenience to provide a rear view from angles in which rear vision is often obscured. The mirror assembly may be mounted as occasion may require, in positions that are not conveniently accessible to the operator of a motor vehicle or of an elevator, for example.

Having described the invention, it will be apparent to those skilled in this art that various modifications and changes may be made in the illustrated embodiment without departing from either the spirit or the scope of the invention. Therefore, what I claim as new and as desired to be secured by Letters Patent is:

1. A rear view mirror comprising a frame provided with means for adjustably mounting the frame on a motor vehicle, a mirror mounted on the frame in a plane substantially vertical to the line of sight, said mirror being provided with vertically spaced trunnions journalled in the frame whereby the mirror may be rotated about an axis containing said trunnions to change its angle with respect to objects to the rear of the vehicle, a motor mechanism on the frame, a drive mechanism connecting the motor and mirror, said motor mechanism comprising a cylindrical member having a magnetizable member therein, said magnetizable member having a neutral position and a position on either side of neutral and disposed to reciprocate relative to the cylinder, means normally urging the motor mechanism to a position where the mirror is in neutral position, and means for selectively magnetizing said magnetizable member to actuate it to one side or the other of said neutral position, the member which reciprocates relative to the other being connected to the mirror drive mechanism.

2. A rear view mirror comprising a frame provided with means for adjustably mounting the frame on a motor vehicle, a mirror mounted on the frame in a plane substantially vertical to the line of sight, said mirror being provided with vertically spaced trunnions journalled in the frame whereby the mirror may be rotated thereon about an axis containing said trunnions to change its angle with respect to objects to the rear of the vehicle, a motor mechanism on a frame, said motor mechanism comprising a non-magnetic cylinder having therein a magnetizable core, selectively energizable coil windings on the cylinder, said magnetizable core being provided with means for urging the core to a neutral position relative to said windings, drive means connecting said core to the mirror, and means for selectively energizing said coil windings to thereby actuate the core to, and hold the same in, a position on one side or the other of said neutral position.

References Cited in the file of this patent

UNITED STATES PATENTS

| | | |
|---|---|---|
| 1,913,874 | Folberth | June 13, 1933 |
| 2,088,597 | Hegenberger | Aug. 3, 1937 |
| 2,696,142 | Langford | Dec. 7, 1954 |